(12) United States Patent
Tsuzuki et al.

(10) Patent No.: US 10,584,030 B2
(45) Date of Patent: *Mar. 10, 2020

(54) NANOCRYSTALLINE COMPOSITE CATALYST FOR STORING/SUPPLYING HYDROGEN, NANOCRYSTALLINE COMPOSITE CATALYST MIXTURE FOR STORING/SUPPLYING HYDROGEN, AND METHOD FOR SUPPLYING HYDROGEN

(71) Applicant: Furukawa Electric Co., Ltd., Tokyo (JP)

(72) Inventors: Yoshikazu Tsuzuki, Tokyo (JP); Kenji Iizuka, Tokyo (JP); Mariko Wakae, Tokyo (JP); Kazuhiko Kurusu, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/870,450

(22) Filed: Jan. 12, 2018

(65) Prior Publication Data

US 2018/0134550 A1 May 17, 2018

Related U.S. Application Data

(63) Continuation of application No. PCT/JP2016/070612, filed on Jul. 12, 2016.

(30) Foreign Application Priority Data

Jul. 15, 2015 (JP) ................. 2015-141695

(51) Int. Cl.
| | |
|---|---|
| *C01B 3/00* | (2006.01) |
| *B01J 23/94* | (2006.01) |
| *B01J 23/755* | (2006.01) |
| *B01J 23/96* | (2006.01) |
| *C01B 3/26* | (2006.01) |
| *B01J 38/02* | (2006.01) |
| *B01J 35/02* | (2006.01) |
| *B01J 23/89* | (2006.01) |
| *B01J 23/42* | (2006.01) |
| *B01J 23/44* | (2006.01) |
| *B01J 23/46* | (2006.01) |
| *B01J 23/50* | (2006.01) |
| *B01J 23/52* | (2006.01) |
| *B01J 23/72* | (2006.01) |

(52) U.S. Cl.
CPC ............ *C01B 3/0078* (2013.01); *B01J 23/42* (2013.01); *B01J 23/44* (2013.01); *B01J 23/462* (2013.01); *B01J 23/464* (2013.01); *B01J 23/50* (2013.01); *B01J 23/52* (2013.01); *B01J 23/72* (2013.01); *B01J 23/755* (2013.01); *B01J 23/89* (2013.01); *B01J 23/94* (2013.01); *B01J 23/96* (2013.01); *B01J 35/02* (2013.01); *B01J 38/02* (2013.01); *C01B 3/00* (2013.01); *C01B 3/0031* (2013.01); *C01B 3/26* (2013.01); *B01J 2231/76* (2013.01); *C01P 2002/10* (2013.01); *C01P 2002/60* (2013.01); *Y02E 60/327* (2013.01); *Y02P 20/52* (2015.11); *Y02P 20/584* (2015.11)

(58) Field of Classification Search
CPC ........ B01J 2231/76; B01J 23/94; B01J 23/42; B01J 23/44; B01J 23/462; B01J 23/464; B01J 23/52; B01J 23/72; B01J 23/755; B01J 23/50; C01P 2002/10; C01P 2002/60; C01B 3/0078; C01B 3/0031
USPC ............. 423/594.19, 594.3, 594.5, 604, 622, 423/648.1, 651; 502/300, 330, 331, 20
See application file for complete search history.

(56) References Cited

U.S. PATENT DOCUMENTS

| | | | |
|---|---|---|---|
| 3,617,518 | A | 11/1971 | Sinfelt et al. |
| 5,439,859 | A | 8/1995 | Coggins et al. |
| 6,162,530 | A | 12/2000 | Xiao et al. |
| 7,166,263 | B2 | 1/2007 | Vanderspurt et al. |
| 7,612,011 | B2 | 11/2009 | Vanderspurt et al. |
| 7,871,957 | B2 | 1/2011 | Willigan et al. |
| 8,790,614 | B2 * | 7/2014 | Richards ................ B82Y 30/00 423/418.2 |
| 2004/0038808 | A1 | 2/2004 | Hampden-Smith et al. |
| 2010/0071179 | A1 | 3/2010 | Koizumi et al. |
| 2013/0142726 | A1 | 6/2013 | Biniwale et al. |
| 2014/0186253 | A1 | 7/2014 | Kitagawa et al. |
| 2015/0086871 | A1 | 3/2015 | Cao et al. |
| 2018/0133649 | A1 | 5/2018 | Tsuzuki et al. |

FOREIGN PATENT DOCUMENTS

| | | |
|---|---|---|
| CN | 104368345 A | 2/2015 |
| JP | S496523 B1 | 2/1974 |

(Continued)

OTHER PUBLICATIONS

Translation of JP2013-240756 A, Dec. 2013 (Year: 2013).*

(Continued)

*Primary Examiner* — Steven J Bos

(74) *Attorney, Agent, or Firm* — Dorsey & Whitney LLP

(57) ABSTRACT

The present disclosure provides that a catalyst exhibits excellent catalytic activity in both a hydrogenation involving a hydrogen-storing body containing an aromatic compound, and a dehydrogenation involving a hydrogen-supplying body containing a hydrogen derivative of the aromatic compound, wherein the catalyst contains a nanocrystalline composite having two or more accumulated flake-like nanocrystalline pieces in a connected state, the flake-like nanocrystalline pieces each having a main surface and an end surface, and in that the nanocrystalline composite is configured such that, when two adjacent nanocrystalline pieces are viewed, an end surface of at least one of the nanocrystalline pieces is connected.

8 Claims, 6 Drawing Sheets

(56) References Cited

FOREIGN PATENT DOCUMENTS

| JP | H07300431 A | 11/1995 |
|---|---|---|
| JP | 2001198469 A | 7/2001 |
| JP | 2006130378 A | 5/2006 |
| JP | 2006524898 A | 11/2006 |
| JP | 2007269522 A | 10/2007 |
| JP | 2010100515 A | 5/2010 |
| JP | 2013240756 A | 12/2013 |
| JP | 2014104451 A | 6/2014 |
| WO | 2004095603 A2 | 11/2004 |
| WO | 2017-528695 A9 | 1/2020 |

OTHER PUBLICATIONS

Translation of JP2006-130378 A, May 2006 (Year: 2006).*

International Search Report and Written Opinion for Application No. PCT/JP2016/070612, dated Sep. 13, 2016 (with English Translation of ISR/WO).

U.S. Appl. No. 15/870,426, entitled "Base Material-Integrated Nanocrystalline Metal Oxide Composite-Containing Catalyst, Method for Manufacturing the Same, and Catalyst Component", filed Jan. 12, 2018.

Biniwale, R.B., et al., Dehydrogenation of Cyclohexane Over Ni Based Catalysts Supported on Activated Carbon Using Spray-Pulsed Reactor and Enhancement in Activity by Addition of a Small Amount of Pt, Catalysis Letters, vol. 105, No. 1, Nov. 2005, pp. 83-87.

Patil, S.P., et al., Non-Noble Ni—Cu/ACC Bimetallic Catalyst for Dehydrogenation of Liquid Organic Hydrides for Hydrogen Storage, International Journal of Hydrogen Energy, vol. 38, No. 35, Oct. 10, 2013, pp. 15233-15241.

Vaseem, et al., Flower-Shaped CuO Nanostructures: Structural, Photocatalytic and Xanes Studies, Catalysis Communications, vol. 10, No. 1, Jul. 29, 2008, pp. 11-16.

Zhu, et al., Self-Assembled 3D Flower-Like Hierarchical β-Ni(OH)2 Hollow Architectures and Their in Situ Thermal Conversion to NiO, Nanoscale Research Letters, vol. 4, pp. 550-557, Feb. 27, 2009.

English Translation of a Written Opinion dated Sep. 13, 2016 for PCT Application No. PCT/JP2016/070612.

English Translation of the International Preliminary Report on Patentability Chapter I dated Jan. 16, 2018 for PCT Application No. PCT/JP2016/070612.

Extended European Search Report dated Apr. 5, 2019 for corresponding EP Application No. 16824471.3.

English translation of Notice for Reasons of Refusal for JP application No. 2017-528695, dated Jan. 14, 2020.

* cited by examiner

NANOCRYSTALLINE COMPOSITE CATALYST FOR STORING/SUPPLYING HYDROGEN, NANOCRYSTALLINE COMPOSITE CATALYST MIXTURE FOR STORING/SUPPLYING HYDROGEN, AND METHOD FOR SUPPLYING HYDROGEN

CROSS REFERENCE TO RELATED APPLICATIONS

This is a continuation application of International Patent Application No. PCT/JP2016/070612 filed Jul. 12, 2016, which claims the benefit of Japanese Patent Application No. 2015-141695 filed Jul. 15, 2015, the full contents of all of which are hereby incorporated by reference in their entirety.

BACKGROUND

Technical Field

The present disclosure relates to a nanocrystalline composite catalyst for storing/supplying hydrogen exhibiting excellent catalytic activity in both a hydrogenation involving a hydrogen-storing body containing an aromatic compound, and a dehydrogenation involving a hydrogen-supplying body containing a hydrogen derivative of the aromatic compound, a nanocrystalline composite catalyst mixture for storing/supplying hydrogen, and a method for supplying hydrogen.

Description of the Related Art

In recent years, hydrogen has attracted attention as a next-generation energy source to replace fossil fuels such as oil. Fuel cell power generation systems using such hydrogen are used as power sources for a diversity of applications to automobiles, consumer power-generation facilities, vending machines, mobile devices, and the like, and technological developments have been rapidly progressing.

However, hydrogen is gaseous at ordinary temperature and normal pressure, and thus is more difficult to store and transport than liquids and solids. Also, hydrogen is a flammable substance, for which care should be taken in handling. Therefore, a major problem is involved in transportation, storage, and supply systems for use of hydrogen.

Recently in particular, as a method for storing hydrogen which is excellent in safety, transportability, and storage capability, an organic hydride system using a hydrocarbon such as cyclohexane or decalin has attracted attention.

For example, although benzene and cyclohexane are cyclic hydrocarbons that have the same carbon atom numbers, benzene is an unsaturated hydrocarbon wherein a carbon-carbon bond contains a double bond, whereas cyclohexane is a saturated hydrocarbon having no double bond. Therefore, cyclohexane is obtained by a hydrogenation involving benzene, and benzene is obtained by a dehydrogenation involving cyclohexane.

By using the hydrogenation and the dehydrogenation involving these hydrocarbons, the storage and supply of hydrogen are enabled. Since aromatic compounds such as benzene are liquid at room temperature, they are excellent in transportability.

Therefore, in recent years, research and development of organic hydride systems using aromatic compounds have been actively performed. For example, a metal support catalyst exhibiting excellent catalytic activity with respect to two kinds of different reversible reactions as the above hydrogenation and the above dehydrogenation, and a system for storing/supplying hydrogen using the metal support catalyst are disclosed in Japanese Laid-Open Patent Publication No. 2001-198469 (JP 2001-198469A). Additionally, in Japanese Laid-Open Patent Publication No. 2007-269522 (JP 2007-269522A), a system for storing/transporting hydrogen using the organic hydride system as described above is disclosed.

In the organic hydride system as described above, it is general to use, as a catalyst, precious metal catalysts exhibiting comparatively excellent catalytic activity, such as platinum (Pt), rhodium (Rh), and palladium (Pd), from the viewpoint of improving reaction efficiency. However, since the precious metal catalyst such as platinum is expensive, and has a resource depletion problem, reduction in the amount of the precious metal catalyst to be used is required in recent years. However, the reduction in the amount of the precious metal catalyst to be used is not considered at all in both JP 2001-198469A and JP 2007-269522A.

As means for reducing the amount of the precious metal catalyst to be used, for example, by making catalyst particles finer to nanoparticles having a nanometer scale particle diameter of less than 1 μm, it is useful to increase the area (surface area) ratio of a catalyst surface (active surface) producing a catalyst reaction, or to substitute an inexpensive transition metal or oxide thereof for a part of the precious metal catalyst.

However, when making the catalyst particles finer to the nanoparticles, a problem is that the aggregation and the like of the finer catalyst particles prevent the increased active surface from being effectively utilized. When substituting the transition metal or oxide catalyst thereof, a problem is that these catalysts have lower catalytic activity than the precious metal catalyst has.

Therefore, even if the amount of the precious metal catalyst to be used is reduced using these means, the reaction efficiency of the above reaction also tends to decrease with the reduction in the amount of the precious metal catalyst to be used, so that the sufficient reduction in the amount of the precious metal catalyst to be used has not yet been achieved.

SUMMARY

The present disclosure is related to providing a nanocrystalline composite catalyst for storing/supplying hydrogen, wherein shape of catalyst particles is made into a nanocrystalline composite in which flake-like nanocrystalline pieces are accumulate in a predetermined relationship, catalyst particles do not readily aggregate as well as the surface area of a main surface (active surface) can be effectively enlarged and the nanocrystalline composite catalyst exhibits excellent catalytic activity in both a hydrogenation involving a hydrogen-storing body containing an aromatic compound, and a dehydrogenation involving a hydrogen-supplying body containing a hydrogen derivative of the above aromatic compound.

The present disclosure is related to providing a nanocrystalline composite catalyst mixture for storing/supplying hydrogen which is obtained by mixing a first catalyst containing the catalyst containing a nanocrystalline metal composite with a second catalyst containing the catalyst containing a nanocrystalline metal oxide composite, can provide reduction in the amount of a precious metal catalyst to be used, and exhibits excellent catalytic activity.

The present disclosure is related to providing a method for supplying hydrogen which can reduce the amount of the precious metal catalyst to be used by using the catalyst as a catalyst promoting a dehydrogenation involving the hydrogen-supplying body, and exhibits excellent reaction efficiency.

The present inventors have studied reduction in the amount of a precious metal catalyst to be used, and have found that, by making catalyst particles finer to nanoparticles and accumulating two or more flake-like nanocrystalline pieces in a connected state in a predetermined positional relationship to form a nanocrystalline composite, the catalyst particles do not readily aggregate as well as the surface area of a main surface (active surface) can be effectively enlarged and the nanocrystalline composite catalyst exhibits excellent catalytic activity.

A first aspect of the present disclosure includes a nanocrystalline composite catalyst for storing/supplying hydrogen exhibiting excellent catalytic activity in both a hydrogenation involving a hydrogen-storing body containing an aromatic compound, and a dehydrogenation involving a hydrogen-supplying body containing a hydrogen derivative of the aromatic compound, the catalyst contains a nanocrystalline composite having two or more accumulated flake-like nanocrystalline pieces in a connected state, the flake-like nanocrystalline pieces each having a main surface and an end surface; and the nanocrystalline composite is configured such that, when two adjacent nanocrystalline pieces are viewed, an end surface of at least one of the nanocrystalline pieces is connected.

It may be preferable that the catalyst further contains a base material and at least one nanocrystalline piece forming the nanocrystalline composite is configured to be connected to a surface of the base material.

It may be preferable that the nanocrystalline composite is a nanocrystalline metal composite in which the nanocrystalline piece forming the nanocrystalline composite contains one or two or more metals or alloys selected from the group of Pd, Rh, Ru, Pt, Ag, and Au.

It may be preferable that the nanocrystalline composite is a nanocrystalline metal oxide composite in which the nanocrystalline piece forming the nanocrystalline composite contains a metal oxide containing one or two or more metals selected from the group of Cu, Ni, Co, and Zn.

It may be preferable that the metal oxide contains at least Cu.

It may be preferable that the metal oxide is a Ni—Cu composite oxide.

A second aspect of the present disclosure includes a nanocrystalline composite catalyst mixture for storing/supplying hydrogen is obtained by mixing a first catalyst containing the nanocrystalline composite catalyst for storing/supplying hydrogen with a second catalyst containing the nanocrystalline composite catalyst for storing/supplying hydrogen.

A third aspect of the present disclosure includes a method for supplying hydrogen includes the step of contacting the nanocrystalline composite catalyst for storing/supplying hydrogen with a solution containing the hydrogen-supplying body, wherein the catalyst promotes a dehydrogenation involving the hydrogen-supplying body to extract the hydrogen by the contacting step.

It may be preferable that the method further including the steps of:

separating the catalyst from the solution; and subjecting the catalyst after the separation to a reactivation treatment.

According to the present disclosure, it is possible to provide a nanocrystalline composite catalyst for storing/supplying hydrogen which contains a nanocrystalline composite having two or more accumulated flake-like nanocrystalline pieces in a connected state, the flake-like nanocrystalline pieces each having a main surface and an end surface, wherein the nanocrystalline composite is configured such that, when two adjacent nanocrystalline pieces are viewed, an end surface of at least one of the nanocrystalline pieces is connected, and thereby catalyst particles do not readily aggregate as well as the surface area of a main surface (active surface) can be effectively enlarged and the nanocrystalline composite catalyst exhibits excellent catalytic activity in both a hydrogenation involving a hydrogen-storing body containing an aromatic compound, and a dehydrogenation involving a hydrogen-supplying body containing a hydrogen derivative of the aromatic compound.

According to the present disclosure, it is possible to provide a nanocrystalline composite catalyst mixture for storing/supplying hydrogen which is obtained by mixing a first catalyst containing the catalyst containing a nanocrystalline metal composite with a second catalyst containing the catalyst containing a nanocrystalline metal oxide composite, can provide reduction in the amount of a precious metal catalyst to be used, and exhibits excellent catalytic activity.

Furthermore, according to the present disclosure, it is possible to provide a method for supplying hydrogen which can reduce the amount of the precious metal catalyst to be used, by using the catalyst as a catalyst promoting a dehydrogenation involving the hydrogen-supplying body, and exhibits excellent reaction efficiency.

BRIEF DESCRIPTION OF DRAWINGS

FIG. 1A is a plan (top) view; and FIG. 1B is a sectional view on line I-I.

FIG. 2A is a plan (top) view; and FIG. 2B is a sectional view on line II-II.

FIG. 3A shows an SEM image taken at a magnification of 5000×; and FIG. 3B shows an SEM image taken at a magnification of 30000×.

DETAILED DESCRIPTION

Next, preferred embodiments of a nanocrystalline composite catalyst for storing/supplying hydrogen according to the present disclosure will be described below.

The nanocrystalline composite catalyst for storing/supplying hydrogen according to the present disclosure is a catalyst which exhibits excellent catalytic activity in both a hydrogenation involving a hydrogen-storing body containing an aromatic compound, and a dehydrogenation involving a hydrogen-supplying body containing a hydrogen derivative of the aromatic compound.

The hydrogen-storing body containing an aromatic compound is not particularly limited, and examples thereof include benzene, toluene, xylene, mesitylene, naphthalene, methylnaphthalene, anthracene, biphenyl, and phenanthrene. Among these, benzene, toluene, xylene, and naphthalene and the like are particularly suitably used from the aspect of efficiency, and toluene is particularly suitable.

The hydrogen-supplying body containing a hydrogen derivative of the aromatic compound is not particularly limited as long as the hydrogen-supplying body itself is stable, and dehydrogenated to stable aromatics. Examples thereof include monocyclic hydrogenated aromatics such as cyclohexane, methylcyclohexane, and dimethylcyclohexane; bicyclic hydrogenated aromatics such as tetralin, decalin, and methyldecalin; and tricyclic hydrogenated aromatics such as tetradecahydroanthracene. Among these, monocyclic hydrogenated aromatics such as cyclohexane, methylcyclohexane, and dimethylcyclohexane, and bicyclic hydrogenated aromatics such as tetralin, decalin, and methyldecalin are suitably used, and methylcyclohexane is particularly suitable.

For example, when the hydrogen-storing body containing an aromatic compound is toluene, the hydrogen-supplying body containing a hydrogen derivative of the aromatic compound is methyl cyclohexane. More specifically, toluene and methyl cyclohexane are cyclic hydrocarbons that have the same carbon atom numbers, and toluene is an unsaturated hydrocarbon wherein a carbon-carbon bond contains a double bond, whereas methyl cyclohexane is a saturated hydrocarbon having no double bond. Toluene is converted by a hydrogenation into methyl cyclohexane, which can store hydrogen, and when methyl cyclohexane is subjected to a dehydrogenation, it can discharge (supply) hydrogen, whereby toluene is reproduced. Toluene and methyl cyclohexane can maintain a liquid state in a wide temperature range of from −95° C. to +100° C., so that toluene and methyl cyclohexane are particularly useful as a medium for storing/supplying hydrogen in that the use of a solvent also under all the environments on the earth is not required.

The hydrogenation and dehydrogenations as described above are performed in the presence of a catalyst, and the nanocrystalline composite catalyst for storing/supplying hydrogen according to the present disclosure exhibits excellent catalytic activity in both the reactions.

Figure 1A:
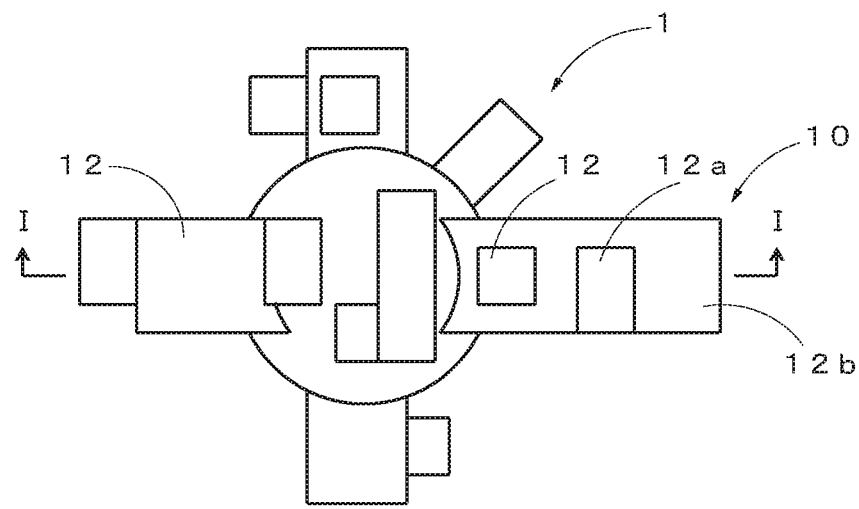
FIGS. 1A and 1B schematically show one embodiment of a nanocrystalline composite catalyst for storing/supplying hydrogen according to the present disclosure.
Figure 1B:
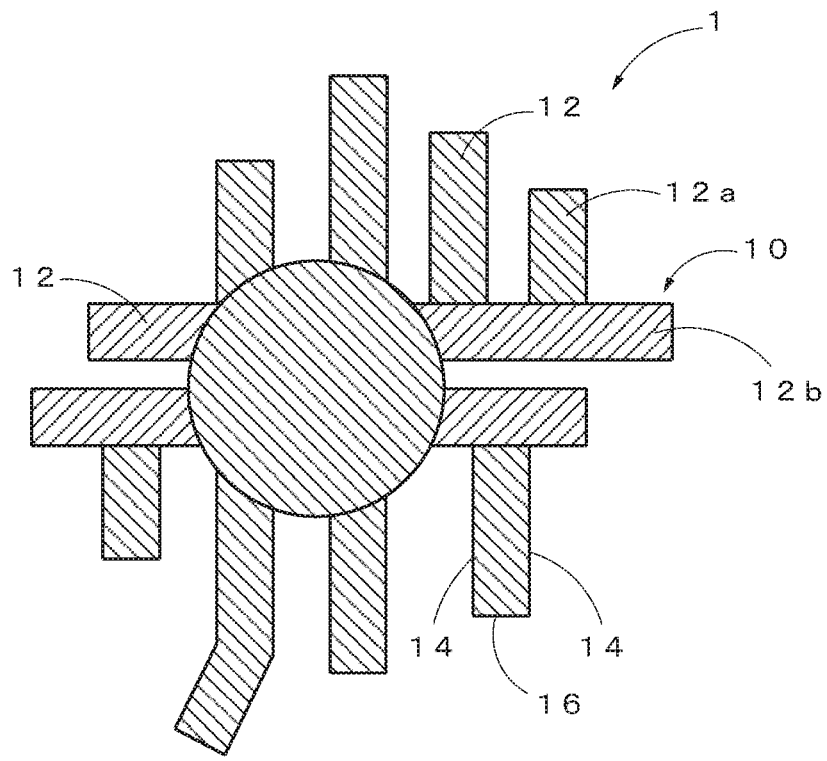

FIG. 1 shows one embodiment of a nanocrystalline composite catalyst for storing/supplying hydrogen according to the present disclosure, and numeral number 1 in FIG. 1 designates a nanocrystalline composite catalyst for storing/ supplying hydrogen, and numeral number 10 designates a nanocrystalline composite.

A nanocrystalline composite catalyst 1 for storing/supplying hydrogen shown in FIG. 1 (hereinafter, may be merely referred to as a "catalyst") contains a nanocrystalline composite 10.

The constitutional main feature of the catalyst 1 of the present disclosure lies in reducing the amount of a precious metal catalyst to be used, making catalyst particles finer to nanoparticles, and accumulating two or more flake-like nanocrystalline pieces 12 in a connected state in a predetermined positional relationship to form the nanocrystalline composite 10. More specifically, the nanocrystalline composite 10 is configured such that, when two adjacent nanocrystalline pieces 12*a* and 12*b* are viewed, an end surface 16 of at least one nanocrystalline piece 12*a* is connected. When the configuration is employed, the catalyst particles do not readily aggregate; the surface area of a main surface (active surface) 14 can be effectively enlarged; and excellent catalytic activity in both the reactions can be exhibited.

Herein, "an end surface 16 of at least one nanocrystalline piece 12*a* is connected" is specifically intended to include both a case where the end surface 16 of one nanocrystalline piece 12*a* of two adjacent nanocrystalline pieces 12*a* and 12*b* is connected to the main surface 14 of another nanocrystalline piece 12*b* and a case where the end surfaces 16 of both the nanocrystalline pieces 12*a* and 12*b* are connected to each other.

Figure 2A:
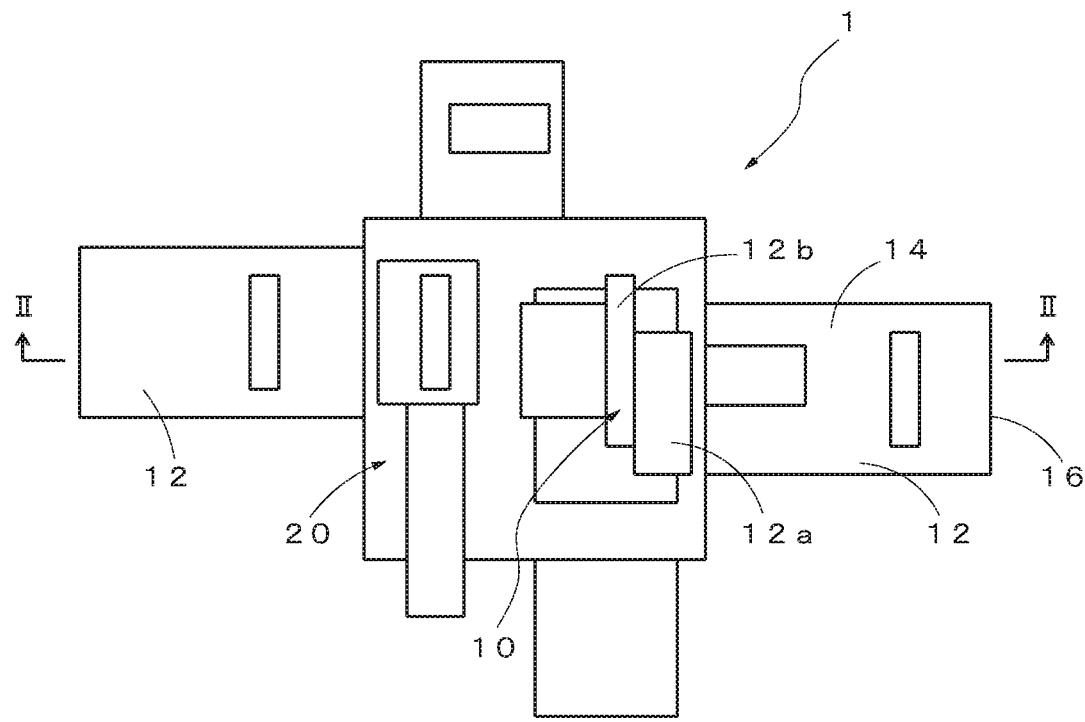
FIGS. 2A and 2B schematically show another embodiment of a nanocrystalline composite catalyst for storing/supplying hydrogen according to the present disclosure.
Figure 2B:
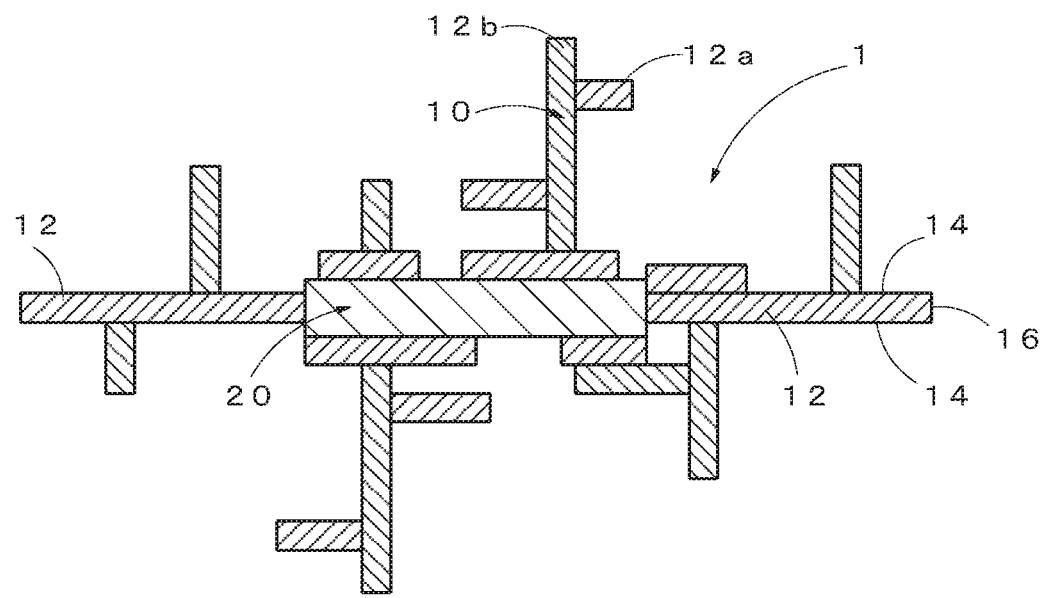

The catalyst 1 of the present disclosure is mainly characterized by containing the specific nanocrystalline composite 10 as described above, and may further contain a base material, as shown, for example, in FIG. 2, without being limited to the configuration of FIG. 1.

FIG. 2 shows another embodiment of the nanocrystalline composite catalyst for storing/supplying hydrogen according to the present disclosure, and numeral number 20 in FIG. 2 designates a base material. The catalyst 1 shown in FIG. 2 mainly contains the nanocrystalline composite 10 and the base material 20.

The catalyst 1 shown in FIG. 2 contains the base material 20, and at least one nanocrystalline piece 12 forming the nanocrystalline composite 10 is configured to be connected to the surface of the base material 20, whereby the nanocrystalline pieces 12*a*, 12*b*, . . . are not readily separated even if a force caused by vibration or impact acts thereon, so that the whole shape can be satisfactorily maintained.

Herein, the nanocrystalline composite 10 means a portion which does not contain the base material 20, and is configured from the whole of the plurality of accumulated nanocrystalline pieces 12.

Figure 3A:
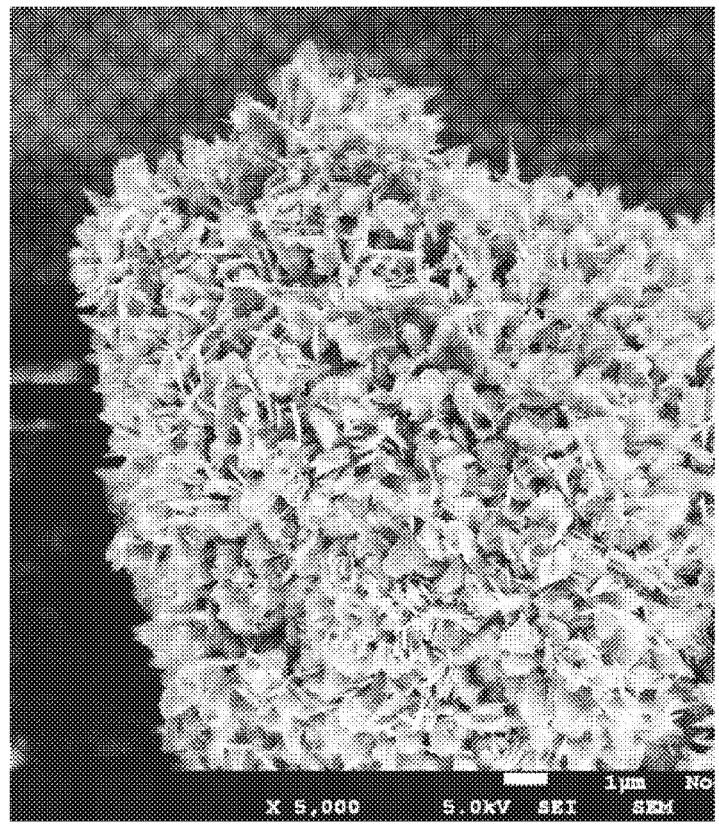
FIGS. 3A and 3B show an example of an SEM image when a nanocrystalline composite catalyst for storing/supplying hydrogen according to the present disclosure is observed with a scanning electron microscope (SEM)
Figure 3B:
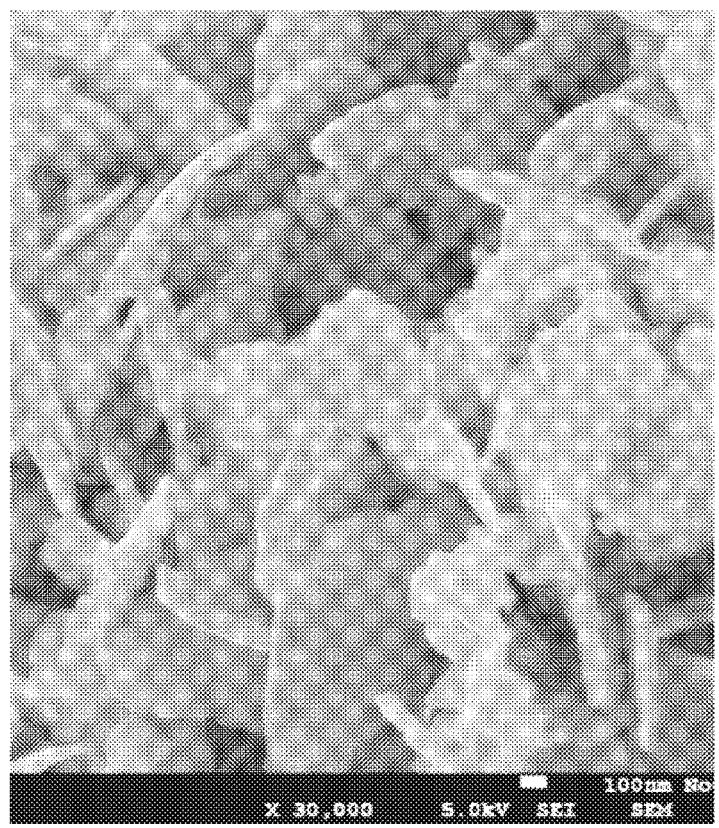

FIG. 3 shows an example of an SEM image when the nanocrystalline composite 10 according to the present disclosure is observed with a scanning electron microscope (SEM). FIG. 3A shows an SEM image taken at a magnification of 5000×, and FIG. 3B shows an SEM image taken at a magnification of 30000×. The SEM images shown in FIGS. 3A and 3B show that the nanocrystalline composite 10 of the present disclosure having two or more accumulated flake-like nanocrystalline pieces in a connected state, the flake-like nanocrystalline pieces each having a main surface and an end surface, and the nanocrystalline composite is configured such that, when two adjacent nanocrystalline pieces 12*a* and 12*b* are viewed, the end surface 16 of at least one nanocrystalline piece 12*a* is connected.

The nanocrystalline piece 12 has a main surface 14 and an end surface 16, and has a flake-like shape. The main surface 14 preferably has a maximum length of 10 nm to 10 μm and a minimum length of 1 nm to 1 μm. The end surface 16 preferably has a length of ¹⁄₁₀ of the minimum length of the main surface or 10 nm or less. The surface area ratio of the main surface 14 to the end surface 16 in the nanocrystalline piece 12 is preferably 10 times or more in that excellent catalytic activity is exhibited. The thickness of the nanocrystalline piece 12 is not particularly limited, and the thickness is preferably 1 to 20 nm, and more preferably 1 to 10 nm. The maximum length and the minimum length of the main surface 14 can be defined based on a pair of parallel lines and two other parallel lines perpendicular to the pair of parallel lines among pairs of parallel lines circumscribing the main surface 14 in a two-dimensional shape. The maximum length of the main surface 14 is defined as a distance between the pair of parallel lines selected so as to maximize the distance between the pair of parallel lines circumscribing the main surface 14. The minimum length of the main surface 14 is defined as a distance between the pair of parallel lines selected so as to maximize the distance between the pair of parallel lines perpendicular to the pair of parallel lines used for the determination of the maximum length of the main surface 14.

Additionally, the nanocrystalline piece 12 preferably contains at least one of a metal and a metal oxide. The metal and the metal oxide are not particularly limited as long as the metal and the metal oxide are catalyst materials exhibiting catalytic activity in both a hydrogenation involving a hydrogen-storing body containing an aromatic compound, and a dehydrogenation involving a hydrogen-supplying body containing a hydrogen derivative of the aromatic compound. For example, the following metals or metal oxides are suitable.

Examples of the metal having catalytic activity in both the above hydrogenation and the dehydrogenation include precious metals and transition metals. Among these, one or two or more metals or alloys selected from the group of precious metals such as palladium (Pd), rhodium (Rh), ruthenium (Ru), platinum (Pt), silver (Ag), and gold (Au) may be preferable in that excellent catalytic activity is produced. More specifically, the nanocrystalline piece forming the nanocrystalline composite preferably contains one or two or more metals or alloys selected from the group of Pd, Rh, Ru, Pt, Ag, and Au. Hereinafter, the nanocrystalline composite containing the nanocrystalline piece containing the metal is referred to as a "nanocrystalline metal composite".

Furthermore, examples of the metal oxide having catalytic activity in both the hydrogenation and the dehydrogenation include oxides of transition metals, precious metals, or alloys thereof. Among these, metal oxides containing one or two or more metals selected from the group of the transition metals may be preferable in that the metal oxides exist in abundance as metal resources on the earth. The metal oxides are more preferable from the viewpoint of controlling the price since the metal oxides are more inexpensive than the precious metals. Also in the transition metals, copper (Cu), nickel (Ni), cobalt (Co), and zinc (Zn) are more preferable. More specifically, the nanocrystalline piece forming the nanocrystalline composite preferably contains a metal oxide containing one or two or more metals selected from the group of Cu, Ni, Co, and Zn. The metal oxide more preferably contains at least copper. Further, examples of the metal oxide as above include a nickel oxide, a copper oxide, a Ni—Cu oxide, and a Cu—Pd oxide. Among these, a Ni—Cu composite oxide may be preferable. Hereinafter, the nanocrystalline composite containing the nanocrystalline piece containing the metal oxide is referred to as a "nanocrystalline metal oxide composite".

Herein, specifically, the main surface 14 of the nanocrystalline piece 12 means two surfaces each having a large surface area among external surfaces of the flake-like nanocrystalline piece 12 and division-forming the upper and lower end edges of an end surface 16 having a narrow surface area. In the present disclosure, it may be preferable for the main surface 14 to be configured to have a specific crystal orientation in order to serve as an active surface. In order that the main surface 14 is configured to serve as a reducible active surface, the faces of metal atoms exhibiting catalytic activity among the metal atoms and oxygen atoms forming the metal oxide may be oriented so as to be located on the main surface 14, thereby constituting the main surface 14 from the layers of the metal atoms. Specifically, the proportion by number of the metal atoms to the metal atoms and the oxygen atoms forming the metal oxide existing on the main surface 14 is preferably 80% or more. In order that the main surface 14 is configured to serve as an oxidizing active surface, the layers of the oxygen atoms exhibiting catalytic activity among the metal atoms and the oxygen atoms forming the metal oxide may be oriented so as to be located in the main surface 14, thereby constituting the main surface 14 from the layers of the oxygen atoms. Specifically, the proportion by number of the oxygen atoms to the metal atoms and the oxygen atoms forming the metal oxide existing on the main surface 14 is preferably 80% or more. By adjusting the proportion by number of the metal atoms or the oxygen atoms to the metal atoms and the oxygen atoms forming the metal oxide existing on the main surface 14 of the nanocrystalline piece 12 according to the purpose of the active surface, the catalytic activity function of the main surface 14 can be improved, and sufficient catalytic activity can be exhibited as the nanocrystalline piece, and furthermore, the nanocrystalline composite 10.

The main surface of the nanocrystalline piece has the specific crystal orientation. A main crystal orientation on the main surface varies with the type of the metal oxide forming the nanocrystalline piece. For this reason, a crystal orientation of the main surface is not specifically described. For example, when the metal oxide is copper oxide (CuO), the main crystal orientation of a single crystal forming the main surface is preferably [001].

When constituting the main surface 14 from the metal atom layer, a metal atom layer is preferably located on the main surface 14 as an ordered structure where the metal atom layer and an oxygen atom layer are regularly stacked alternately in the crystal structure of a metal oxide so that atoms are arranged in a regular manner. Specifically, the case where the metal atom layer exists on the main surface 14 includes not only a case of a structure where the main surface 14 contains an aggregate of single crystals having the same orientation but also a case of a structure where the main surface 14 contains an aggregate of single crystals having different crystal structures or different orientations, or an aggregate containing crystal grain boundaries or polycrystals.

The percentage of the area of the main surface 14 of the nanocrystalline piece 12 covered by connection thereof to the other adjacent nanocrystalline piece 14 is preferably in the range of 5 to 20%. This is because, when the percentage of the area is less than 5%, the bond strength of the other adjacent nanocrystalline piece 14 is not sufficiently obtained to readily cause separation, and when the percentage of the area is more than 20%, the surface area of the main surface 14 which is the active surface tends to become insufficient.

In the nanocrystalline composite 10, the plurality of nanocrystalline pieces 12, 12, . . . may be preferably in a dendrite-like (dendritic) connected state in that the surface area of the main surface 14 can be effectively secured.

When the catalyst 1 contains the base material 20, the base material 20 may be a material used in order to accumulate a plurality of nanocrystalline pieces forming the nanocrystalline composite 10 to accumulate in a connected state, and have a surface property in which the plurality of nanocrystalline pieces can be accumulated in a connected state. For example, the main surface 14 of the nanocrystalline piece 12 is more preferably a seed crystal material having a surface promoting the growth of the nanocrystalline piece 12 so as to have a specific crystal orientation. By using the seed crystal material for the base material 20, the nanocrystalline piece 12 having the main surface having a specific orientation can be preferentially grown from the surface of the base material 20 in a short time, and the nanocrystalline composite catalyst 1 for storing/supplying hydrogen is readily manufactured. Furthermore, the productivity of the nanocrystalline composite catalyst 1 can also be markedly improved.

The shape of the base material 20 does not need to be particularly limited, and the shape may be a polyhedron shape in addition to a hexahedron shape such as a cube or a rectangular parallelepiped. Particularly, since the surface of the base material having a concavo-convex shape readily provides nucleation, it may be preferable to control the roughness of the surface of the base material (for example, control the number of minute unevennesses, and the like), or to form the base material 20 in a mesh state.

It may be preferable that the material of the base material 20 contain a material having the same composition as that of the nanocrystalline piece 12 to be preferentially grown when the base material is used as the seed crystal material. The material of the base material 20 may be a material providing nucleation on the surface of the base material. When the base material is not used as the seed crystal material, the material of the base material is not particularly limited, and may be a material having a surface quality (physical properties and a state and the like) in which the nanocrystalline piece 12 can be deposited, and the like in a connected state.

Figure 4:
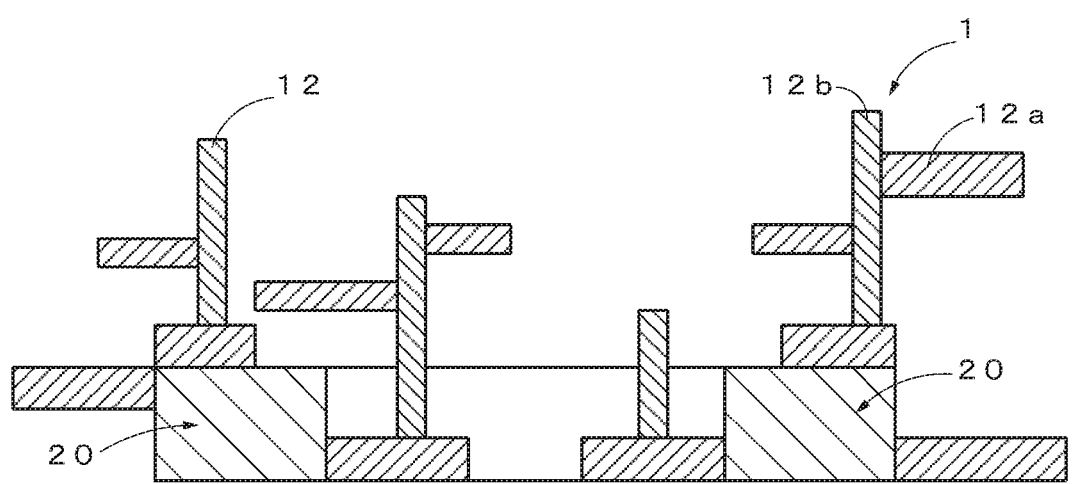
FIG. 4 is a sectional view schematically showing another embodiment of a nanocrystalline composite catalyst for storing/supplying hydrogen according to the present disclosure.

Examples of the shape of the catalyst 1 containing the base material include a shape obtained by growing the nanocrystalline piece 12 from the whole surface of the base material, as shown in FIG. 2, and a case of employing a shape obtained by growing the nanocrystalline piece 12 from the surface of the base material, as shown in FIG. 4.

A method for manufacturing the catalyst 1 of the present disclosure is not particularly limited. For example, a method for manufacturing a catalyst 1 containing a base material 20 as shown in FIG. 2 preferably includes the steps of preparing a seed crystal material as the base material 20, preferentially growing a nanocrystalline piece 14 from the surface of the base material 20, and accumulating two or more nanocrystalline pieces 14 on the surface of the base material 20 in a connected state to integrally form a nanocrystalline composite.

a. Examples of the step of integrally forming the nanocrystalline composite include the step of applying a high temperature and a high pressure to an alcohol and a halide of a metal or alloy thereof as raw materials by a hydrothermal synthesizing (hydrothermal) method.

Furthermore, it may be preferable that a nanocrystalline composite catalyst mixture for storing/supplying hydrogen of the present disclosure contain the above catalyst 1, in that the amount of the precious metal catalyst to be used can be reduced. When the catalyst 1 contains the above nanocrystalline metal composite, excellent catalytic activity can be exhibited while the amount of the precious metal catalyst to be used is reduced, and the whole amount of the catalyst can also be reduced. When the catalyst 1 contains the above nanocrystalline metal oxide composite, at least a part of the precious metal catalyst can be replaced with an inexpensive transition metal oxide catalyst, so that the cost for the catalyst material can be largely reduced.

Furthermore, the above catalyst mixture may further contains another catalyst containing conventional spherical particles having smooth surfaces, and the like as necessary. The catalyst containing conventional spherical particles having smooth surfaces readily aggregates, cannot effectively use active surfaces, and cannot sufficiently improve catalytic activity even if the catalyst is nanoparticulated. However, the catalyst 1 of the present disclosure contains the above specific nanocrystalline composite 10, which can effectively prevent the aggregation of the catalyst particles each other, and can effectively utilize the active surfaces of the catalyst particles. Therefore, even a catalyst mixture containing the above catalyst 1 and also conventional spherical particles having a smooth surface suppresses the aggregation of the catalyst particles, so that excellent catalytic activity can be exhibited.

The nanocrystalline composite catalyst mixture for storing/supplying hydrogen of the present disclosure is more preferably obtained by mixing a first catalyst containing the catalyst 1 containing the above nanocrystalline metal composite with a second catalyst containing the catalyst 1 containing the above nanocrystalline metal oxide composite in that the amount of the precious metal catalyst to be used can be further reduced, and catalytic activity can also be further improved.

A method for manufacturing the catalyst mixture is not particularly limited, and the method can be performed by preparing a first catalyst and a second catalyst separately, and mixing the catalysts at a desired ratio, for example.

In addition, the catalyst 1 of the present disclosure can be compounded with a carbon carrier, to provide a composite material. Examples of the carbon carrier include marimo carbon. The use of the marimo carbon which has a large surface area and does not readily aggregate provides an increase in an active point, weight saving, and high heat conduction, so that the improvement effect of a reaction rate is also obtained.

Figure 5:
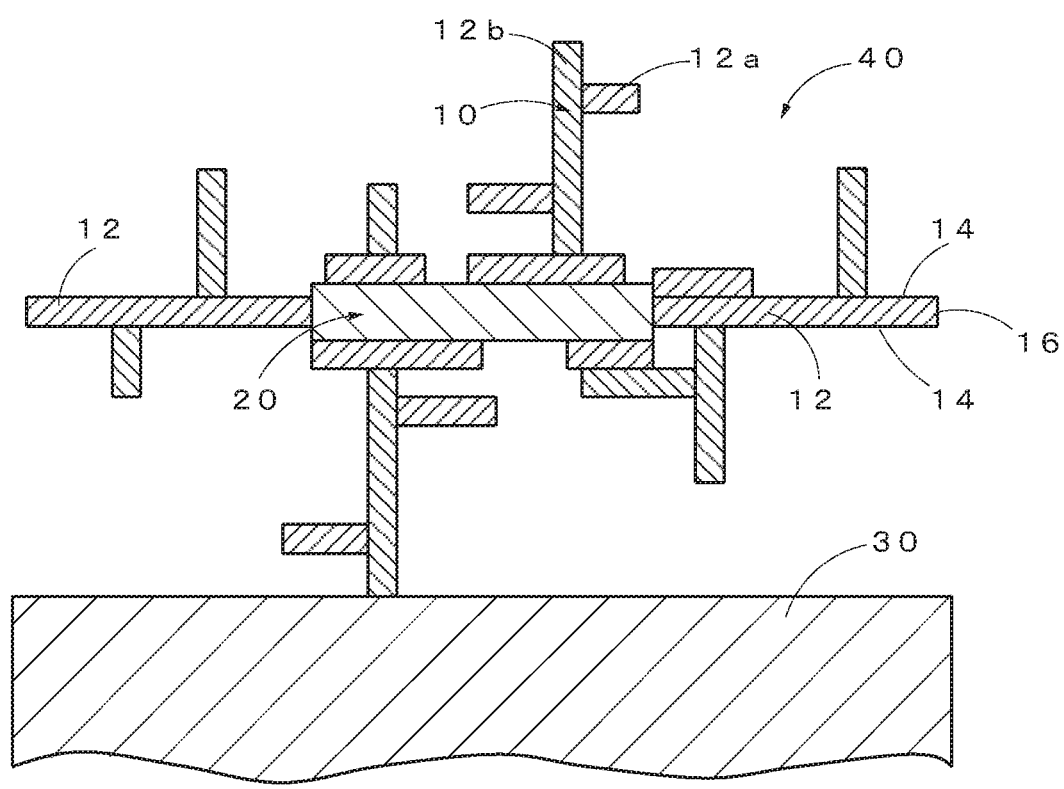
FIG. 5 is a sectional view schematically showing one embodiment of a catalyst component according to the present disclosure.
Figure 6:
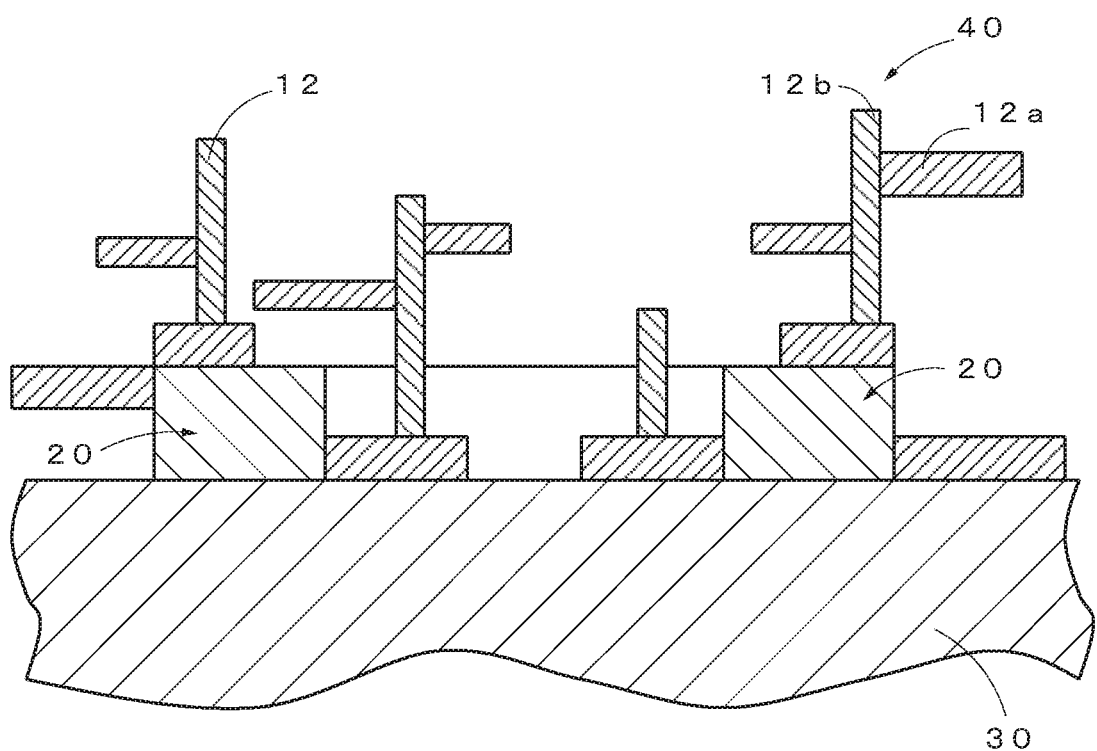
FIG. 6 is a sectional view schematically showing another embodiment of a catalyst component according to the present disclosure.

Furthermore, in a catalyst component 40 of the present disclosure, the catalyst 1 shown in any of FIGS. 1, 2, and 4 is preferably connected to the carrier 30 having a cell structure (honeycomb structure). As shown in FIG. 5, it may be preferable that a portion of the nanocrystalline composite 10 (more strictly, one end of the nanocrystalline piece) of the catalyst 1 shown in FIG. 2 is connected (a case where the catalyst 1 shown in FIG. 1 is connected is also the same), or a portion of the base material 20 forming the catalyst 1 shown in FIG. 4 is connected as shown in FIG. 6.

A method for manufacturing the catalyst component 40 is not particularly limited. For example, the catalyst component 40 can be manufactured by immersing a carrier 30 containing a porous ceramic material into an aqueous solution in which a particulate catalyst 1 and ceramic particles of alumina ($Al_2O_3$), silica ($SiO_2$), and the like are dispersed, pulling up the carrier 30, and thereafter drying and firing (sintering) the carrier 30. Alternatively, the catalyst component 40 can be manufactured by a wash coat treatment for immersing a carrier 30 to which a base material 20 is previously connected into an aqueous solution in which a particulate catalyst 1 and ceramic particles of alumina ($Al_2O_3$) and silica ($SiO_2$) and the like are dispersed, pulling up the carrier 30, and thereafter drying and firing (sintering) the carrier 30. In addition, the catalyst component 40 can be manufactured by using various surface coating techniques such as wet type plating, dry type plating, and a sol gel method.

The nanocrystalline composite catalyst for storing/supplying hydrogen according to the present disclosure exhibits excellent catalytic activity in both a hydrogenation involving a hydrogen-storing body containing an aromatic compound, and a dehydrogenation involving a hydrogen-supplying body containing a hydrogen derivative of the aromatic compound, and can be suitably used as a catalyst promoting the hydrogenation and the dehydrogenation.

Hereinafter, a preferred embodiment of a method for supplying hydrogen using the nanocrystalline composite catalyst for storing/supplying hydrogen according to the present disclosure will be described.

The method for supplying hydrogen according to the present disclosure includes the step of contacting the nanocrystalline composite catalyst for storing/supplying hydrogen according to the present disclosure with a solution containing the hydrogen-supplying body, wherein the catalyst promotes a dehydrogenation involving the hydrogen-supplying body to extract the hydrogen by the contacting step. The method for supplying hydrogen exhibits excellent reaction efficiency.

The solution containing the hydrogen-supplying body is not particularly limited as long as the solution contains the hydrogen-supplying body. Examples thereof include a solution containing only the hydrogen-supplying body, a solution in which the hydrogen-supplying body is dispersed in a solvent. Various additive agents and the like may be added as necessary.

As the hydrogen-supplying body, the above-mentioned materials can be used, for example. Among these, methyl cyclohexane, cyclohexane, and decalin can be suitably used. Particularly, methyl cyclohexane may be preferable in that methyl cyclohexane can be independently used without using a solvent.

When the solvent is used, a solvent suitable for dispersion may be selected according to the type of the hydrogen-supplying body. Therefore, the solvent may be a solvent in which the hydrogen-supplying body is satisfactorily dispersed in the solvent, and the solvent may be an organic solvent, water, or a mixed solvent thereof.

A form in which the solution containing the hydrogen-supplying body is contacted with the catalyst of the present disclosure is not particularly limited. For example, the catalyst 1 as shown in FIGS. 1 and 2 may be added in a powder form into the solution, or the catalyst component 40 in which the catalyst 1 has previously been connected to the carrier 30 as shown in FIG. 6 may be used to contact the catalyst component 40 itself with the solution.

When the powdered catalyst 1 is used, it may be preferable to perform reaction while stirring the solution containing the hydrogen-supplying body in order to maintain dispersibility. It is also preferable to further add a dispersing agent from the viewpoint of satisfactorily keeping the dispersibility of the catalyst 1. The dispersing agent is not particularly limited, and examples thereof include n-hexadecyl trimethylammonium bromide (CTAB) as a cationic surface-active agent, dodecyl sodium sulfate (SDS) as an anionic surface-active agent, and polyvinyl pyrrolidone (PVP) as a nonionic surface-active agent.

Further, when the catalyst component 40 is used, it may be preferable that a portion with which the catalyst 1 is supported is sufficiently immersed into the solution so that the catalyst 1 connected to the carrier can be satisfactorily contacted with the hydrogen-supplying body, and the solution is stirred or circulated as necessary.

A temperature at which the dehydrogenation involving a hydrogen-supplying body is performed is not particularly limited, and can be suitably set according to ingredients and the like forming the hydrogen-supplying body or the catalyst. For example, it may be preferable to perform the hydrogenation at a temperature of 150 to 400° C.

The method for supplying hydrogen according to the present disclosure preferably further includes the steps of separating the catalyst from the solution, and subjecting the catalyst after the separation to a reactivation treatment. By collecting the nanocrystalline composite catalyst after use, and subjecting the nanocrystalline composite catalyst to the reactivation treatment, a nanocrystalline composite catalyst exhibiting excellent catalytic activity can be reproduced.

A method for separating the nanocrystalline composite catalyst from the solution containing the hydrogen-supplying body is not particularly limited. For example, if the catalyst is in a powder form, the catalyst can be collected by filtering and the like. Further, if the catalyst is fixed to the carrier, the catalyst can be readily collected by pulling up the carrier itself from the solution.

The condition of the reactivation treatment is not particularly limited, and can be suitably set according to the ingredients forming the nanocrystalline composite catalyst, and the material of the carrier, and the like. For example, it may be preferable to heat-treat the catalyst at a temperature of 60 to 300° C. in a vacuum, or a reducing gas atmosphere such as hydrogen.

The nanocrystalline composite catalyst after the reactivation treatment exhibits excellent catalytic activity, and can be reused as the catalyst for storing/supplying hydrogen. The nanocrystalline composite catalyst can be used also as a catalyst for the other application.

The case where hydrogen is supplied has been described hereinabove using the nanocrystalline composite catalyst for storing/supplying hydrogen according to the present disclosure. A case where hydrogen is stored using the catalyst can also be similarly performed. The catalyst used for the above hydrogenation can also be reproduced as the catalyst exhibiting excellent catalytic activity by use of above-mentioned reactivation treatment.

The embodiment of the present disclosure has been described hereinabove, but the present disclosure is not limited to the above embodiment. The present disclosure includes all aspects included in the concept and claims of the present disclosure, and can be variously modified within the scope of the present disclosure.

EXAMPLES

Hereinafter, the present disclosure will be described in more detail with reference to Examples, but the present disclosure is not limited thereto.

Example 1

As a base material, a catalyst carrier was prepared, which was obtained by forming a nickel-copper alloy on the surface of a porous polygon alumina by electroless plating. Next, 20 g of the base material was placed in a container, and 1 g of copper (II) chloride dihydrate, 1.5 g of nickel(II) chloride hexahydrate, 1.4 g of urea, 80 ml of ethylene glycol, and 120 ml of water were mixed to obtain a mixed solution. The mixed solution was heat-treated at 150° C. for 10 hours to obtain a mixture. Thereafter, the mixture was washed with pure water, and vacuum-dried at 70° C. under vacuum for 10 hours to obtain 20.2 g of a nanocrystalline composite catalyst in which nanocrystalline small pieces made of a nickel-copper alloy composite oxide existed on the surface of the base material.

Example 2

A part of the nanocrystalline composite catalyst obtained in Example 1 was placed in a container, subjected to vacuum deaeration, and heated at 150° C. for 1 hour. To 303 mg of the nanocrystalline composite catalysts after heating, 4.0 mg of a chloroplatinic acid [H$_2$PtCl$_6$.(H$_2$O)$_6$] powder was added at room temperature, followed by mixing to obtain a mixture. The mixture was stirred under a nitrogen atmosphere at 150° C. for 1 hour, and held under a hydrogen atmosphere at 250° C. for 1 hour, followed by stirring to obtain 304.2 mg of a platinum-mixed nanocrystalline composite catalyst.

Comparative Example 1

A nickel-copper alloy was formed on 300 mg of porous polygon alumina as a carrier by electroless plating, and heat-treated at 250° C. in atmospheric air for 1 hour to obtain 303 mg of a nickel-copper composite oxide catalyst. The obtained catalyst was one in which nano-sized spherical particles aggregated.

Comparative Example 2

A chloroplatinic acid [H$_2$PtCl$_6$] solution was sprayed onto 20 g of porous polygon alumina as a carrier, and fired at 350° C. in nitrogen gas for 3 hours. Furthermore, the temperature was increased from room temperature to 350° C. in an atmosphere in which nitrogen contained 10% of hydrogen, to obtain 20.2 g of a platinum-supported alumite catalyst (hereinafter, merely referred to as a platinum catalyst) supporting 200 mg of platinum. The obtained catalyst was one in which nano-sized spherical particles aggregated.
[Evaluation]
Next, the catalyst characteristics of each of the catalysts obtained above were evaluated as follows.

cooling: 5° C.), and subjected to a dehydrogenation for 1 hour, to evaluate the inversion rate (%) of methyl cyclohexane.
(Evaluation 2: Reaction Time: 10 Hours)
The same evaluation as the evaluation 1 was performed except that the reaction time of a dehydrogenation was set to 10 hours.
(Evaluation 3: Reaction Time: 10 Hours×100 Cycles)
By the same method as that of the evaluation 2, 1 ml of methyl cyclohexane was subjected to a dehydrogenation for 10 hours, to obtain a reaction product. After the reaction was completed, the reaction product was cooled to room temperature. Then, 1 ml of methyl cyclohexane was newly added, subjected to external heating again, and subjected to a dehydrogenation for 10 hours under a condition of boiling under reflux. The work was repeated so that the dehydrogenation for 10 hours was taken as 1 cycle, and 100 cycles in total were achieved, to evaluate the inversion rate (%) of methyl cyclohexane at the 100th cycle.
(Evaluation 4: Regarding Catalyst after Reactivation Treatment, Reaction Time: 1 Hour)
Each of the catalysts after 100 cycles under the condition of the evaluation 3 was subjected to a reactivation treatment (vacuum-dried under vacuum at 70° C. for 10 hours), and the same evaluation as the evaluation 1 was performed using each of the catalysts after the treatment.
(Evaluation 5: Regarding Catalyst after Reactivation Treatment, Reaction Time: 10 Hours)
The same evaluation as the evaluation 4 was performed except that the reaction time of a dehydrogenation was set to 10 hours.

TABLE 1

| | | Inversion rate of methyl cyclohexane | | | | |
| | | Before reactivation treatment | | | After reactivation treatment | |
| | Type of catalyst (material) | Reaction time: 1 hour | Reaction time: 10 hours | Reaction time: 10 hours ×100 cycles | Reaction time: 1 hour | Reaction time: 10 hours |
| --- | --- | --- | --- | --- | --- | --- |
| Example 1 | Nanocrystalline composite catalyst (A Ni—Cu composite oxide) | 55% | 89% | 60% | 49% | 90% |
| Example 2 | Platinum-mixed nanocrystalline composite catalyst (A Ni—Cu composite oxide + platinum) | 60% | 91% | 82% | 55% | 89% |
| Comparative Example 1 | Oxide catalyst (A Ni—Cu composite oxide) | 1% | 5% | 1% | 1% | 4% |
| Comparative Example 2 | Precious metal catalyst(platinum) | 50% | 92% | 90% | 52% | 91% |

Regarding the amount of each of the catalysts to be used, the amount of the nanocrystalline composite catalyst of Example 1 was 303.0 mg (base material: 300 mg, nanocrystalline composite: 3.0 mg); the amount of the platinum-mixed nanocrystalline composite catalyst of Example 2 was 304.2 mg (base material: 300 mg, nanocrystalline composite: 3.0 mg, platinum; 1.2 mg); the amount of the nickel-copper composite oxide catalyst of Comparative Example 1 was 303.0 mg (carrier: 300 mg, nickel-copper composite oxide: 3.0 mg); and the amount of the platinum catalyst of Comparative Example 2 was 303.0 mg (carrier: 300 mg, platinum: 3.0 mg). Each of the evaluations was performed three times, and the results obtained by averaging the evaluations are shown in Table 1.
(Evaluation 1: Reaction Time: 1 Hour)
Each of the above catalysts, and 1 ml of methyl cyclohexane were placed in a batch type reactor, subjected to a condition of boiling under reflux (external heating: 250° C., It was confirmed that for the nickel-copper composite oxide catalyst not containing the specific nanocrystalline composite according to the present disclosure (Comparative Example 1), no effective catalyst performance cannot be obtained. On the other hand, it was confirmed that even for the nickel-copper composite oxide catalysts, in the case of catalysts containing the specific nanocrystalline composite according to the present disclosure (the nanocrystalline composite catalyst of Example 1 and the platinum-mixed nanocrystalline composite catalyst of Example 2), effective catalyst performance can be obtained after the reaction time of 1 hour and 10 hours, and the catalyst performance of each of the catalysts is equivalent to that of the platinum catalyst widely used heretofore (Comparative Example 2).

The nanocrystalline composite catalyst containing the nickel-copper composite oxide of Example 1 had reduced catalyst performance after 100 cycles, the catalyst performance being about 60% after 10 hours. The reduced catalyst performance can be recovered to the initial catalyst performance by the reactivation treatment. More specifically, it was confirmed that performance equivalent to that of the platinum catalyst (Comparative Example 2) is obtained by combining the nanocrystalline composite catalyst of Example 1 with the reactivation treatment.

On the other hand, it was confirmed that the platinum-mixed nanocrystalline composite catalyst of Example 2 obtained by mixing the nanocrystalline composite catalyst containing the nickel-copper composite oxide with platinum has less reduced catalyst performance after 100 cycles, and has performance almost equivalent to that of the platinum catalyst of Comparative example 2. Furthermore, it was confirmed that, although the amount of platinum to be used in the platinum-mixed nanocrystalline composite catalyst of Example 2 is ½ or less of that in the platinum catalyst of Comparative Example 2 (the content of platinum per 304.2 mg of the platinum-mixed nanocrystalline composite catalyst of Example 2 is 1.2 mg, and the content of platinum per 303.0 mg of the platinum catalyst of Comparative Example 2 is 3.0 mg), the inversion rate after 10 hours as the catalyst performance of the catalyst of Example 2 is equivalent to that of the platinum catalyst of Comparative Example 2, and the inversion rate of the catalyst of Example 2 after 1 hour is slightly faster than that of the platinum catalyst of Comparative Example 2.

Thus, the nanocrystalline composite catalyst containing the nickel-copper composite oxide of Example 1 was deemed to be an inexpensive catalyst material having a low resource risk. It was confirmed that catalyst performance equivalent to that of the conventional platinum catalyst can be obtained even for continuous use by suitably using the nanocrystalline composite catalyst in combination with the reactivation treatment. It was also confirmed that the platinum-mixed nanocrystalline composite catalyst of Example 2 has a lower effect on a price or a resource risk than that of the nanocrystalline composite catalyst of Example 1, but the platinum-mixed nanocrystalline composite catalyst is a catalyst material for which the conventional platinum catalyst can be substituted in that the reactivation treatment is not required, or the number of times of the reactivation treatment can be largely reduced.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A nanocrystalline composite catalyst exhibiting catalytic activity in both a hydrogenation of a hydrogen-storing body containing an aromatic compound, and a dehydrogenation of a hydrogen-supplying body containing a hydrogen derivative of the aromatic compound,
    wherein the catalyst contains
        a nanocrystalline composite having two or more accumulated flake-like nanocrystalline pieces in a connected state, the flake-like nanocrystalline pieces each having a main surface and an end surface; and
        a base material;
    the nanocrystalline composite is configured such that, when two adjacent nanocrystalline pieces are viewed, an end surface of one nanocrystalline piece of the two adjacent nanocrystalline pieces is connected to a main surface of another nanocrystalline piece of the two adjacent nanocrystalline pieces, or end surfaces of both the two adjacent nanocrystalline pieces are connected to each other, and
    at least one nanocrystalline piece forming the nanocrystalline composite is configured to be connected to a surface of the base material.

2. The nanocrystalline composite catalyst according to claim 1, wherein the nanocrystalline composite is a nanocrystalline metal composite in which the nanocrystalline pieces forming the nanocrystalline composite contains one or more metals selected from the group consisting of Pd, Rh, Ru, Pt, Ag, and Au, or one or more alloys containing the one or more metals.

3. The nanocrystalline composite catalyst according to claim 1, wherein the nanocrystalline composite is a nanocrystalline metal oxide composite in which the nanocrystalline pieces forming the nanocrystalline composite contains a metal oxide comprising an oxide of one or more metals selected from the group consisting of Cu, Ni, Co and Zn.

4. The nanocrystalline composite catalyst according to claim 3, wherein the metal oxide is an oxide of Cu.

5. The nanocrystalline composite catalyst according to claim 4, wherein the metal oxide is a Ni—Cu composite oxide.

6. A nanocrystalline composite catalyst mixture is obtained by mixing a first catalyst containing the nanocrystalline composite catalyst for storing/supplying hydrogen according to claim 3 with a second catalyst containing the nanocrystalline composite catalyst for storing/supplying hydrogen according to claim 3.

7. A method for supplying hydrogen comprising a step of:
    contacting the nanocrystalline composite catalyst according to claim 1 with a solution containing the hydrogen-supplying body, and
    preparing a seed crystal material as the base material, preferentially growing the nanocrystalline pieces from the surface of the base material, and accumulating two or more nanocrystalline pieces on the surface of the base material in a connected state to integrally form the nanocrystalline composite,
    wherein the catalyst promotes a dehydrogenation of the hydrogen-supplying body to extract the hydrogen by the contacting step.

8. The method for supplying hydrogen according to claim 7, the method further comprising the steps of:
    separating the catalyst from the solution; and
    subjecting the catalyst after the separation to a reactivation treatment.

* * * * *